(12) United States Patent
Fujimaki et al.

(10) Patent No.: US 7,718,282 B2
(45) Date of Patent: May 18, 2010

(54) MAGNETIC RECORDING MEDIUM WITH CORROSION RESISTANCE AND MANUFACTURING METHOD

(75) Inventors: Shigehiko Fujimaki, Tokyo (JP); Toshinori Ono, Tokyo (JP); Mitsuhiro Shoda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1046 days.

(21) Appl. No.: 11/259,921

(22) Filed: Oct. 26, 2005

(65) Prior Publication Data

US 2006/0093864 A1   May 4, 2006

(30) Foreign Application Priority Data

Oct. 28, 2004   (JP) .............................. 2004-313351

(51) Int. Cl.
   *G11B 5/66*   (2006.01)
(52) U.S. Cl. .................... 428/836.3; 428/827; 428/829; 428/836.2
(58) Field of Classification Search ........................ None
   See application file for complete search history.

(56) References Cited

U.S. PATENT DOCUMENTS

| | | | |
|---|---|---|---|
| 4,587,179 A * | 5/1986 | Nakamura et al. ....... | 428/836.3 |
| 5,652,054 A * | 7/1997 | Kikitsu et al. ............... | 428/328 |
| 6,656,613 B2 * | 12/2003 | Litvinov et al. ............. | 428/827 |
| 6,826,825 B2 * | 12/2004 | Takizawa et al. ......... | 29/603.13 |
| 7,141,316 B2 * | 11/2006 | Iwasaki et al. .............. | 428/828 |
| 7,241,516 B1 * | 7/2007 | Acharya et al. .......... | 428/828.1 |
| 2002/0028357 A1 * | 3/2002 | Shukh et al. .......... | 428/694 TM |
| 2005/0069732 A1 * | 3/2005 | Kamata et al. ........ | 428/694 TC |
| 2006/0246323 A1 * | 11/2006 | Liu et al. .................... | 428/829 |

FOREIGN PATENT DOCUMENTS

| | | |
|---|---|---|
| JP | 2003-016637 | 1/2003 |
| JP | 2003-027258 | 1/2003 |

* cited by examiner

*Primary Examiner*—Kevin M Bernatz
(74) *Attorney, Agent, or Firm*—Townsend and Townsend and Crew LLP; Darren Gold

(57) ABSTRACT

A magnetic recording medium with a granular magnetic recording layer excellent in corrosion resistance is provided. In one embodiment, after formation of, on a non-magnetic substrate, an NiTa adhesion layer, a soft magnetic layer, a Ta intermediate layer, an Ru intermediate layer, and a Co alloy granular magnetic recording layer, hydrogen ($H_2$) plasma processing is applied to the surface of the Co alloy granular magnetic recording layer. Then, a DLC protective film layer is formed and a lubricant layer is coated.

10 Claims, 4 Drawing Sheets

MAGNETIC RECORDING MEDIUM WITH CORROSION RESISTANCE AND MANUFACTURING METHOD

CROSS-REFERENCES TO RELATED APPLICATIONS

This application claims priority from Japanese Patent Application No. JP2004-313351, filed Oct. 28, 2004, the entire disclosure of which is incorporated herein by reference.

BACKGROUND OF THE INVENTION

The present invention relates to a magnetic recording medium and a manufacturing method thereof. In particular, the invention relates to a vertical magnetic recording medium with a vertical magnetic recording layer excellent in corrosion resistance, as well as a manufacturing method thereof.

Importance has been attached more and more to magnetic disk drives for use in storage devices such as large-scaled computers, work stations and personal computers year by year, and they have been developed in terms of larger capacity and reduced size. Increased density is indispensable for increasing the capacity and reducing the size of magnetic disk drives. However, existent longitudinal magnetic recording systems in which minute bar magnets are arranged in a plane on a track for recording involves a problem in that the read output is lowered with time due to thermal fluctuation in a super high density region. On the other hand, vertical magnetic recording systems in which minute bar magnets are arranged vertically on a track surface have been demanded for rapid commercialization of products as the recording system capable of overcoming the problem described above. Examples of the vertical magnetic recording media include granular vertical media and stacked type vertical media. The granular vertical media have a structure of separating magnetic particles by non-magnetic oxides and enable high-density recording through fine crystallization. The stacked type vertical media include extremely thin magnetic layers and non-magnetic layers each with a film thickness of from several A to several tens of A which are alternately deposited, thereby providing large vertical magnetic anisotropy inherent to the multi-layered structure as the whole films. The granular vertical medium sometimes adopted a layer constitution of forming an adhesion layer, a soft magnetic layer, an intermediate layer and a granular magnetic recording layer over a glass substrate or a rigid non-magnetic substrate formed by applying nickel-phosphor plating on aluminum. It is known that the granular magnetic recording layer generally tends to suffer from corrosion.

In a conventional magnetic recording medium manufactured by using a sputtering film formation technique by sputtering, a diamond-like carbon (DLC) protective film is disposed with an aim of protecting a magnetic film against sliding movement by a magnetic head. In addition, the film thickness of the protective film is extremely reduced as far as to 5 nm or less. When the thickness of the protective film is increased for the improvement of the corrosion resistance, this is not preferred since it hinders the improvement of density due to loss of spacing between the magnetic recording layer and the magnetic head. Further, a perfluoro polyether liquid lubricant is generally used on the protective film with an aim of reducing the friction between the magnetic head and the magnetic recording medium.

Patent Document 1 (Japanese Patent Laid-open No. 2003-27258) discloses a pretreatment before forming a protective film on a surface containing at least metal, in which high corrosion resistance can be obtained for the metal surface even when the protective film covering the metal surface is reduced in thickness, by applying a hydrogen treatment to the metal surface thereby removing passivation.

BRIEF SUMMARY OF THE INVENTION

According to the invention described in Patent Document 1, oxides on the surface of a metal are removed by hydrogen plasma reducing processing and the adhesion of the protective film or the underlayer film is improved thereby enhancing the corrosion resistance. The granular magnetic recording layer of the vertical magnetic recording medium involves a problem in that Co in the Co alloy separated by insulators such as $SiO_2$ and formed into the columnar shape is leached from the boundaries of columns, that is, it suffers from corrosion. A grain boundary structure such as that of a granular medium may be constituted by a thermodynamically non-equilibrium process such as sputtering. In this case, crystal defects are highly liable to be formed at the boundary region where crystals of different atom arrangements are in adjacent with each other, and dangling bonds at the boundaries and the crystal grain boundaries due to the crystal defects of the insulators cause the corrosion.

It is therefore a feature of the present invention to provide a magnetic recording medium with a granular magnetic recording layer excellent in corrosion resistance.

It is a another feature of the invention to provide a method of manufacturing a magnetic recording medium with a granular magnetic recording layer excellent in corrosion resistance.

A magnetic recording medium according to an aspect of the present invention comprises a non-magnetic substrate, a soft magnetic layer formed over the non-magnetic substrate, an intermediate layer formed on the soft magnetic layer, a granular magnetic recording layer formed on the intermediate layer, and a protective layer formed on the granular magnetic recording layer, in which a hydrogen concentration in the granular magnetic layer is higher than that in the soft magnetic layer and in the intermediate layer.

In some embodiments, the amount of hydrogen in the granular magnetic recording medium, when measured according to a secondary ion mass spectroscopy, is such that a ratio (H/Co) of 133Cs2+1H to 133Cs+59Co is $2 \times 10^{-3}$ or more. The granular magnetic recording layer comprises a Co alloy separated by Si oxides and formed into a columnar shape. The soft magnetic layer comprises a lower soft magnetic layer, an Ru layer and an upper soft magnetic layer. The lower and upper soft magnetic layers each contain Co, Ta and Zr. The intermediate layer contains Ta and Ru. An adhesion layer is preferably present between the non-magnetic substrate and the soft magnetic layer. A lubricant layer is preferably present on the protective layer. A soft magnetic backing layer is preferably present between the non-magnetic substrate and the soft magnetic layer.

A method of manufacturing a magnetic recording medium according to another aspect of the invention comprises the steps of: providing a non-magnetic substrate; forming a soft magnetic layer, an intermediate layer and a granular magnetic recording layer over the non-magnetic substrate; applying hydrogen plasma processing to the surface of the granular magnetic recording layer; and forming a protective layer on the granular magnetic recording layer subjected to the hydrogen plasma processing.

In the hydrogen plasma processing, a dc, or dc-pulsed negative voltage is applied to the non-magnetic substrate and hydrogen ions are allowed to enter the granular magnetic recording medium. The amount of hydrogen in the granular magnetic recording layer, when measured by a secondary ion mass spectroscopy, is such that a ratio (H/Co) of 133Cs2+1H to 133Cs+59Co is $2 \times 10^{-3}$ or more. The step of forming the soft magnetic layer, the intermediate layer and the granular magnetic recording layer over the non-magnetic substrate is conducted by a DC magnetron sputtering. The step of forming the protective film layer is conducted by a CVD method using a hydrocarbon gas. The protective layer comprises diamond like carbon.

The invention can provide a magnetic recording medium with a granular magnetic recording layer improved in corrosion resistance.

DETAILED DESCRIPTION OF THE INVENTION

Figure 2:
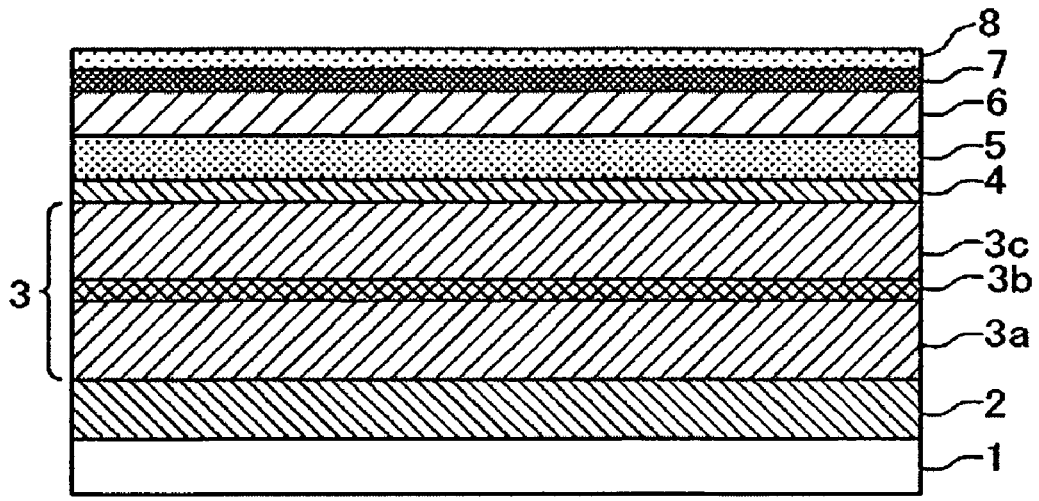
FIG. 2 is a cross-sectional view showing the constitution of a vertical magnetic recording medium according to an embodiment of the invention.

An exemplary embodiment of the present invention is to be described in detail with reference to the drawings. FIG. 2 is a schematic cross-sectional view illustrating a half-portion, on one side, of a magnetic disk which is a vertical magnetic recording medium. On a non-magnetic substrate 1, are stacked a NiTa adhesion layer 2, a soft magnetic layer 3, a Ta intermediate layer 4, an Ru intermediate layer 5, a Co alloy granular magnetic recording layer 6, a protective film layer 7, and a lubricant layer 8. The soft magnetic layer 3 comprises a lower CoTaZr soft magnetic layer 3a, an Ru layer 3b, and an upper CoTaZr soft magnetic layer 3c, and the upper and lower soft magnetic layers are anti-ferromagnetically coupled by the intermediate layer comprising Ru. The concentration of hydrogen in the granular magnetic recording layer is adapted to be higher than that of the adhesion layer, a soft magnetic layer and the intermediate layer. They can improve corrosion resistance.

Then, a description is to be made of the steps up to the formation of the granular magnetic recording layer 6 on the non-magnetic substrate 1. Since usual manufacturing apparatus can be used as the manufacturing apparatus for the vertical magnetic recording medium, its illustration is omitted. A soda lime glass substrate 1 (65 mm in outer diameter, 20 mm in inner diameter, and 0.8635 mm in thickness) is provided and cleaned sufficiently. It is introduced into a vacuum vessel evacuated to about $1.3 \times 10^{-5}$ Pa or less ($1.0 \times 10^{-7}$ Torr).

At first, the substrate is transported to an adhesion layer forming chamber and a Ni-37.5at % Ta adhesion layer 2 is formed to have a thickness of 35 nm by a DC magnetron sputtering method in an Ar atmosphere of about 0.8 Pa (6 mTorr).

Successively, it is transported to a lower soft magnetic layer forming chamber, and a Cr-5 at % Ta-3 at % Zr alloy lower soft magnetic layer 3a is formed to have a thickness of 60 nm by a DC magnetron sputtering method in an Ar atmosphere of about 0.8 Pa (6 mTorr).

Successively, it is transported to an anti-ferromagnetic coupling induction layer forming chamber, and an Ru layer 3b is formed to have a thickness of 0.5 nm by a DC magnetron sputtering method in an Ar atmosphere of about 0.8 Pa (6 mTorr).

Successively, it is transported to an upper soft magnetic layer forming chamber, and a Cr-5 at % Ta-3 at % Zr alloy upper soft magnetic layer 3c is formed to have a thickness of 60 nm by a DC magnetron sputtering method in an Ar atmosphere of about 0.8 Pa (6 m Torr).

Successively, it is transported to a substrate cooling chamber and the substrate temperature raised under the effect of heat by sputtering is lowered to 60° C. It is then transported to a Ta intermediate layer forming chamber and a Ta intermediate layer is formed to have thickness of 2 nm by a DC magnetron sputtering method in an Ar atmosphere of about 0.9 Pa (7 mTorr).

Successively, it is transported to an Ru intermediate layer forming chamber and a Ta intermediate layer is formed to have a thickness of 12 nm by a DC magnetron sputtering method in an Ar atmosphere of about 1.5 Pa (10 mTorr).

Successively, it is transported to a magnetic recording layer forming chamber and a granular magnetic recording layer ($CCP-SiO_2$) 6 comprising 90 mol % (Co-15 a5% Cr-18 at % Pt) 10 mol % $SiO_2$ alloy is formed to have a thickness of 20 nm by a DC magnetron sputtering method in an Ar atmosphere of about 0.9 Pa (7 mTorr).

Examples of the substrate 1 include, in addition to the soda lime glass substrate, an Al—Mg alloy substrate comprising chemically strengthened aluminosilicate and Ni—P subjected to electroless plating, and a non-magnetic rigid substrate comprising silicon, ceramics made of borosilicate glass or the like, or ceramics subjected to glass glazing.

The adhesion layer 2 is provided for preventing electrochemical leaching of alkali metals from soda lime glass and for improving adhesion between the glass and the soft magnetic layer 3. Its thickness is optional. Further, it may be saved if it is unnecessary to use such a layer.

A soft magnetic backing layer may be formed between the adhesion layer 2 and the soft magnetic layer 3. In this case, Ni-18 at % Fe of 6 nm thick, Fe-50 at % Mn of 17 nm thick and Co-10 at % Fe of 3 nm thick are deposited in this order on the adhesion layer 2 to form a soft magnetic backing layer, on which the soft magnetic layer 3 is formed.

The intermediate layer 4 may be made of a NiFe alloy, a NiTa alloy, a TaTi alloy, or the like.

The substrate cooling step can be applied not after the formation of the upper soft magnetic layer 3c but also before the formation of the upper soft magnetic layer 3c or before formation of the granular magnetic recording layer 6, and a plurality of such steps may also be combined.

Figure 5:
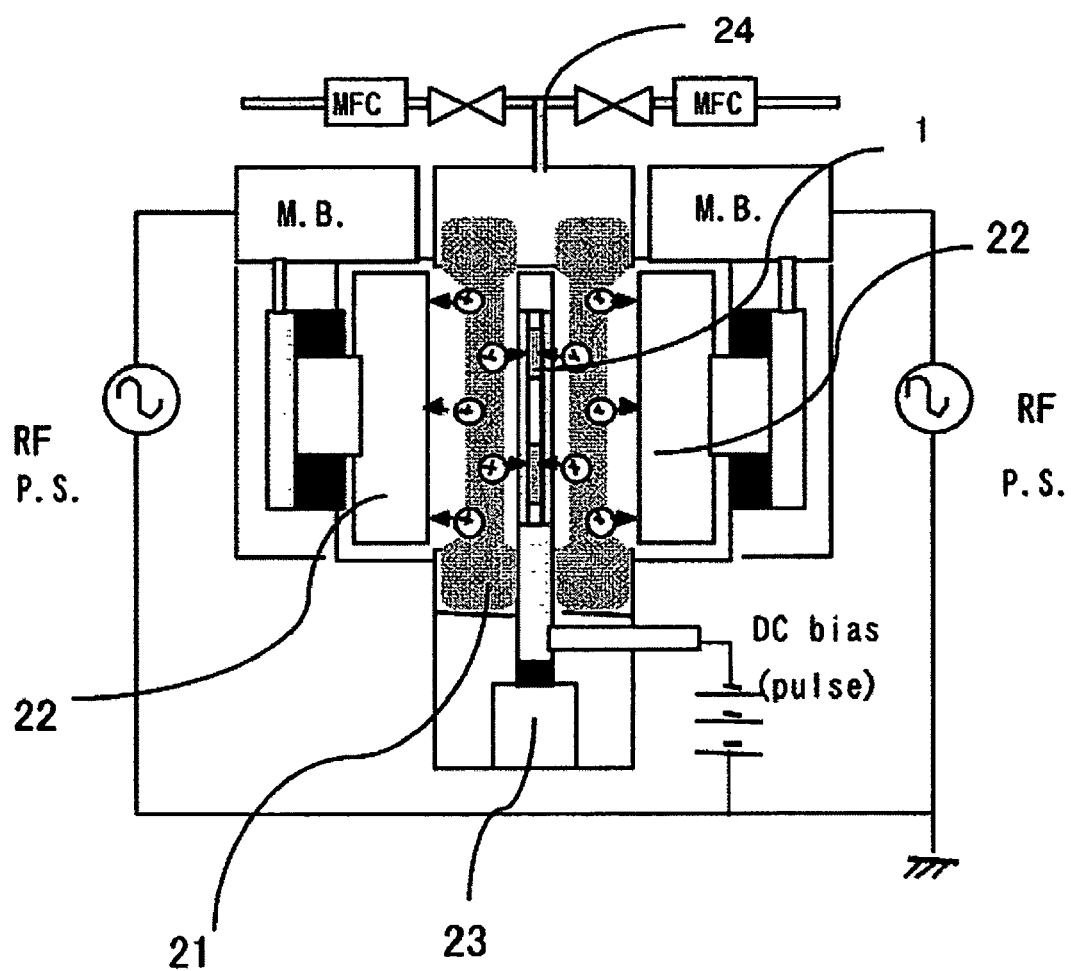
FIG. 5 is a schematic diagram of a hydrogen plasma-processing chamber.

After formation of the granular magnetic recording layer 6, the substrate is transported without being taken out of the vacuum chamber to a hydrogen plasma processing chamber 21 shown in FIG. 5. The hydrogen plasma processing chamber has an RF electrode 22 applied with an RF power through a matching circuit from an RF (ratio frequency (RF)) power source at 13.56 MHz. The RF electrodes 22 are arranged symmetrically with respect to, on both sides of, the substrate 1 to constitute a structure capable of hydrogen plasma processing on both surfaces of the substrate 1 simultaneously. While the hydrogen plasma processing chamber 21 is evacuated by a turbo molecular pump 23, a hydrogen ($H_2$) gas is introduced at 200 to 300 sccm from a gas introduction port 24 above the hydrogen plasma processing chamber by way of a mass flow controller. The pressure in the hydrogen plasma processing chamber 21 in this step is in the range of 1.7 to 3.0 Pa as the reading of a varatron gauge.

RF is applied to the RF electrode 22 to induce plasmas after the elapse of 1.0 sec from the start of the induction of the gas as described above. At the same time, an electrode not shown comprising an aluminum alloy insulated from the ground and the RF electrode in view of the potential is brought into contact with the end face of the substrate for application of a bias voltage to the substrate. The RF power is set to 800 to 1200 W and a negative bias voltage is set to 150 to 350 V.

Figure 1:
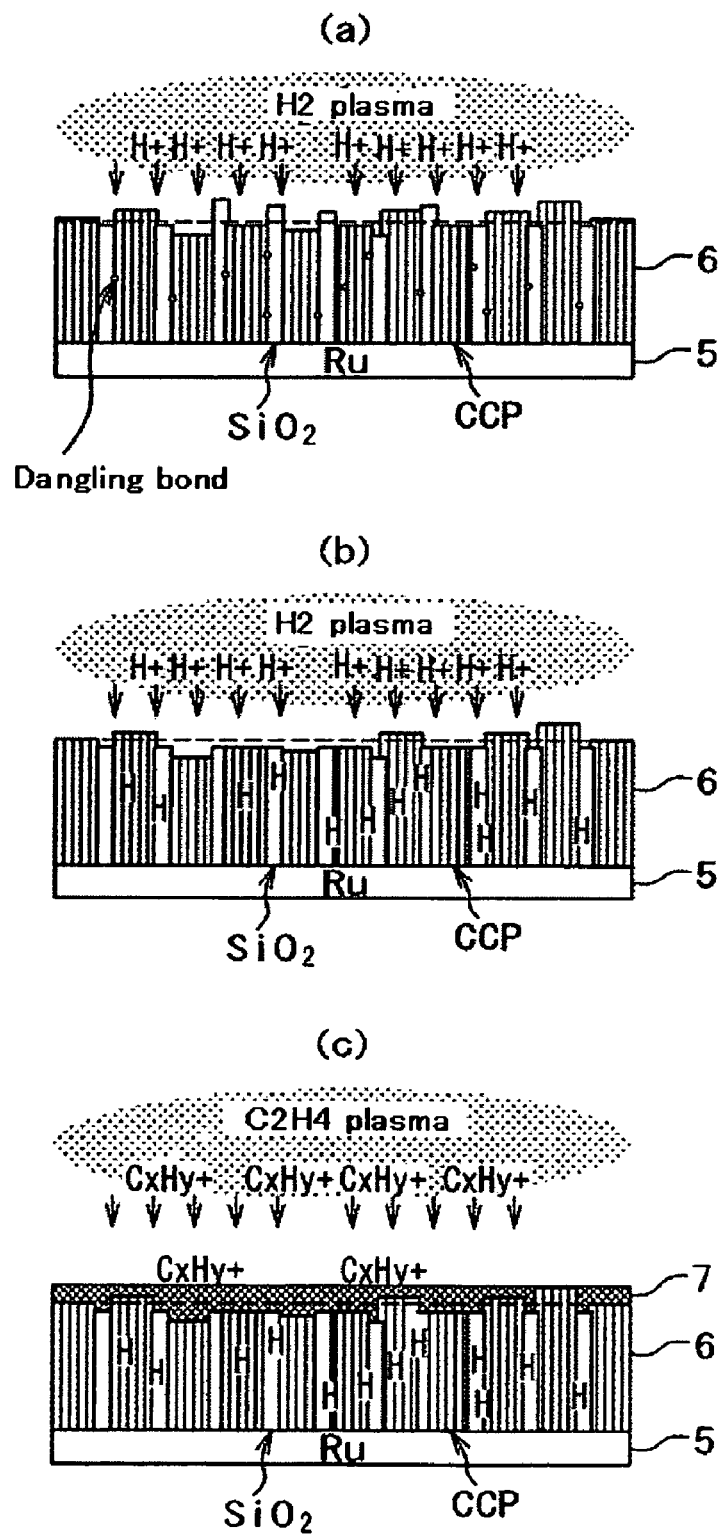
FIGS. 1(a), 1(b) and 1(c) illustrate the hydrogen plasma pretreatment and DLC protective film deposition on a granular magnetic recording layer in an embodiment of the invention.

A DC bias or pulsed negative voltage is applied to the non-magnetic substrate 1 and the surface of the granular magnetic recording layer 6 is subjected to plasma processing by hydrogen ($H_2$) as shown in FIG. 1(a) and FIG. 1(b), by which hydrogen ions (H+) can be injected and implanted to the inside of the granular magnetic recording layer 6. Further, the incident amount of the hydrogen ions can be varied by changing the plasma possessing time. A plurality of kinds of samples were manufactured by using the method. In this case, the self-bias of the RF electrode was −600 to −750 V and the bias current to the substrate was 1.05 to 1.25 A in total including also a portion for a substrate gripping tool. Since light hydrogen ions have small energy interaction with heavy metal elements and tend to be scattered easily, they tend to scatter in a wide range without damaging the crystal structure in the granular magnetic recording layer 6. Accordingly, the hydrogen ions (H+) prevailed in the granular magnetic recording layer 6 deactivate electrically active electrons of dangling bonds that are formed at the boundaries with the Co alloy and at the crystal grain boundaries due to crystal defects of Si oxides.

Since leaching of Co from the boundaries of the Co alloy and Si oxide can be prevented by the treatment, it is possible to prevent the corrosion of the granular magnetic recording layer and improve the corrosion resistance. It will be apparent that the corrosion resistance can be improved by the hydrogen plasma processing described above also for the recording layers so long as they have a structure of separating magnetic particles by the non-magnetic oxides. Further, since the hydrogen ions (H+) are extremely light in weight relative to the atoms constituting the granular magnetic recording layer 6, they scarcely cause destruction of the granular magnetic recording layer 6. That is, since energy exchange is less caused, the magnetic characteristics are scarcely degraded. In addition, since the hydrogen ions having less energy loss and tending to scatter can transport energy over a wide range, they act also effectively, for example, to stacked vertical media having an extremely thin multi-layered structure, not being restricted to the granular vertical medium. Specifically, they can promote the restoration of lattice defects or gaps, etc. that tend to be formed easily in the boundary region where crystals of different arrangement of atoms are in adjacent with each other.

Then, the substrate 1, after the hydrogen plasma processing to the granular magnetic recording layer 6, is transported without being taken out of the vacuum vessel to the protective film layer forming chamber. Thereafter, a hydrocarbon gas such as ethylene ($C_2H_4$) is introduced to the protective film layer forming chamber and a DLC protective film layer 7 is formed to have a thickness of 4.0 nm by an RF chemical vapor deposition method (RF CVD).

While the vertical magnetic recording disk medium can be manufactured by the steps described above, it is desirable to form a lubricant layer 8 on the DLC protective film 7 as shown in FIG. 2. In this embodiment, a fluoro carbon type lubricant is applied to have a thickness of about 1.2 nm by a dipping method.

Figure 3:
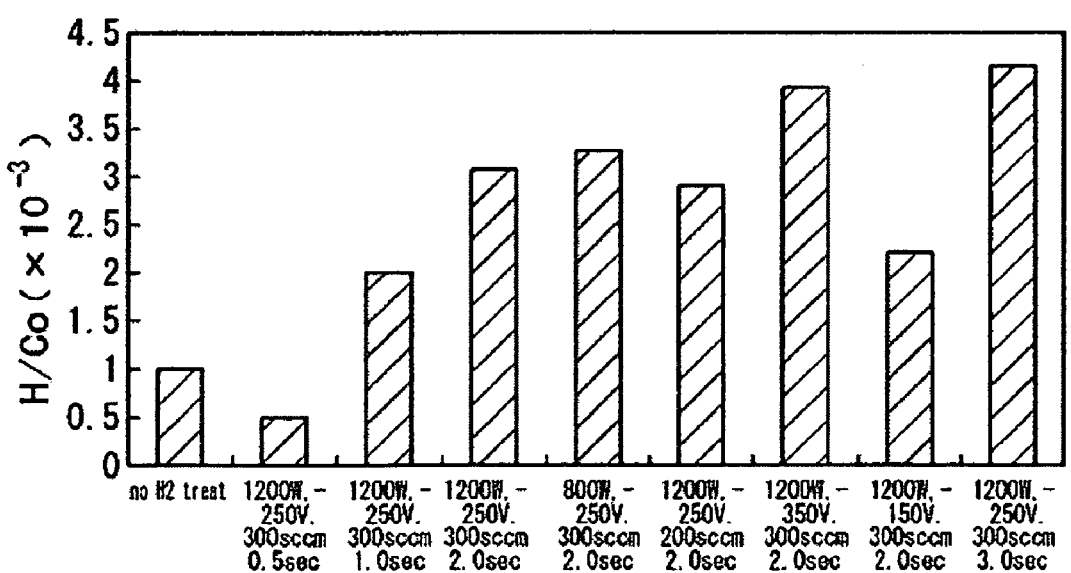
FIG. 3 is a graph showing a relationship between the hydrogen plasma processing time and H/Co in the granular magnetic recording layer.

The amount of hydrogen in the granular magnetic recording layer of the vertical magnetic recording medium manufactured by the manufacturing method described above was measured by a secondary ion mass spectroscopy and the ratio of hydrogen to Co (H/Co) was determined as shown in FIG. 3. Using a DSIMS (Dynamic Secondary Ion Mass Spectroscopy) measuring apparatus, $133Cs_2+1H$ and $133Cs+12C$ and $133Cs+59Co$ were detected at Cs 350 V, 20 nA for a measured area of 700 um, at a take out angle of 80 degrees. The boundary between C (protective film layer) and Co (granular magnetic recording layer) was defined as a point where the intensity of $133Cs+12C$ and that of $133Cs+59Co$ was reversed, and the position at 1.8 times measuring time therefrom was defined as the inside of Co (the inside of granular magnetic recording layer). The ratio of $133Cs_2+1H$ to $133Cs+59Co$ at the point was defined as H/Co.

Figure 4:
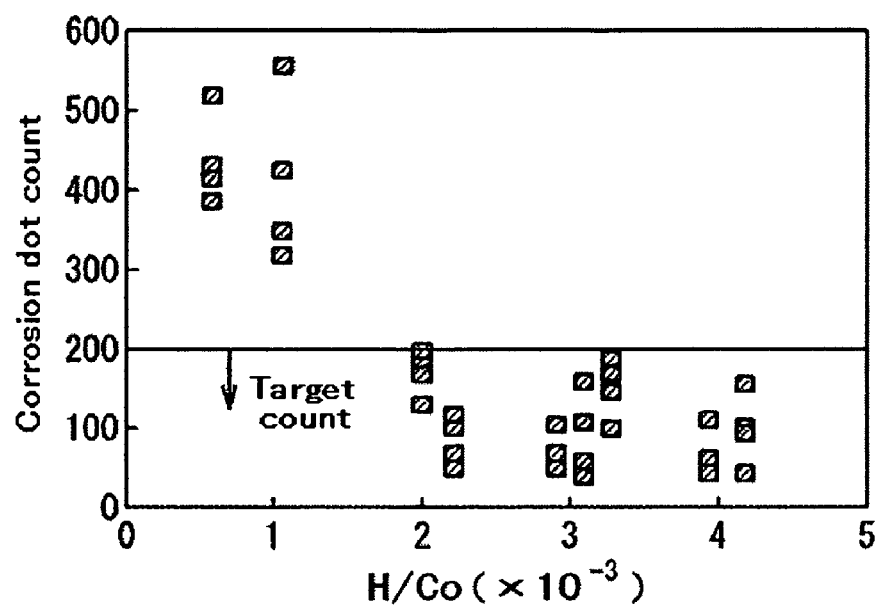
FIG. 4 is a graph showing a relationship between H/Co of the granular magnetic recording layer and the corrosion resistance of the vertical magnetic recording medium.

The corrosion resistance of the vertical magnetic recording medium manufactured by the manufacturing method described above was evaluated under the following conditions and the results are shown in FIG. 4. The vertical magnetic recording medium was left in a temperature/humidity circumstantial vessel at a temperature of 60° C. and 95% relative humidity for 4 days. The vertical recording magnetic recording medium was taken out of the temperature/humidity circumstantial vessel after 4 days. Corrosion dots on the surface of the medium were counted by corrosion analysis measurement. From FIG. 4, it can be seen that corrosion resistance is improved remarkably when H/Co is about $2 \times 10^{-3}$ or more.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic recording medium comprising:
   a non-magnetic substrate;
   a soft magnetic layer formed over the non-magnetic substrate;
   an intermediate layer formed on the soft magnetic layer;
   a granular magnetic recording layer having a magnetic alloy separated by oxides, formed on the intermediate layer; and
   a protective layer formed on the granular magnetic recording layer;
   wherein a hydrogen concentration in the granular magnetic layer is higher than a hydrogen concentration in the soft magnetic layer and in the intermediate layer.

2. A magnetic recording medium according to claim 1 wherein the amount of hydrogen in the granular magnetic recording layer, when measured by a secondary ion mass spectrometry, is such that a ratio (H/Co) of $133Cs_2+1H$ to $133Cs+59Co$ is about $2 \times 10^{-3}$ or more.

3. A magnetic recording medium according to claim 1 wherein the granular magnetic recording layer comprises a Co alloy separated by Si oxides and formed into a columnar shape.

4. A magnetic recording medium according to claim 3 wherein the soft magnetic layer comprises a lower soft magnetic layer, an Ru layer and an upper soft magnetic layer.

5. A magnetic recording medium according to claim 4 wherein the lower and upper soft magnetic layers each contain Co, Ta, and Zr.

6. A magnetic recording medium according to claim 3 wherein the intermediate layer contains Ta and Ru.

7. A magnetic recording medium according to claim 1 wherein an adhesion layer is present between the non-magnetic substrate and the soft magnetic layer.

8. A magnetic recording medium according to claim 1 wherein a lubricant layer is present on the protective layer.

9. A magnetic recording medium according to claim 1 wherein a soft magnetic backing layer is present between the non-magnetic substrate and the soft magnetic layer.

10. A magnetic recording medium according to claim 1, wherein the protective layer comprises diamond-like carbon.

* * * * *